US006894139B2

(12) United States Patent
Kreyenschmidt et al.

(10) Patent No.: US 6,894,139 B2
(45) Date of Patent: May 17, 2005

(54) CATALYSTS, IN PARTICULAR FOR THE PREPARATION OF POLYISOCYANATE POLYADDUCTS

(75) Inventors: Martin Kreyenschmidt, Lohne (DE); Hauke Malz, Diepholz (DE); Dieter Rodewald, Bad Essen (DE); Thomas Flug, Wagenfeld (DE); Ansgar Frericks, Osnabrück (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 34 days.

(21) Appl. No.: 10/312,284

(22) PCT Filed: Jul. 4, 2001

(86) PCT No.: PCT/EP01/07638

§ 371 (c)(1), (2), (4) Date: Dec. 20, 2002

(87) PCT Pub. No.: WO02/04537

PCT Pub. Date: Jan. 17, 2002

(65) Prior Publication Data

US 2003/0176618 A1 Sep. 18, 2003

(30) Foreign Application Priority Data

Jul. 7, 2000 (DE) ........................................ 100 33 120

(51) Int. Cl.$^7$ .......................... C08G 18/18; B01J 31/00; B01J 31/04; B01J 31/16; B01J 31/18

(52) U.S. Cl. ......................... 528/49; 502/162; 502/167; 502/200; 521/107; 521/108; 521/118; 521/121; 521/129; 528/51; 528/53; 560/24; 560/25; 560/26; 560/115; 560/157; 560/158

(58) Field of Search ................................ 502/162, 167, 502/200; 521/107, 108, 118, 121, 129; 528/49, 51, 53; 560/115, 157, 158, 24, 25, 26

(56) References Cited

U.S. PATENT DOCUMENTS

| | | | | |
|---|---|---|---|---|
| 3,719,680 A | | 3/1973 | Abbate et al. | 544/400 |
| 3,721,674 A | | 3/1973 | Abbate et al. | 544/400 |
| 4,189,543 A | | 2/1980 | Doorakian et al. | 521/128 |
| 4,239,855 A | * | 12/1980 | Zimmerman | 521/115 |
| 4,348,536 A | | 9/1982 | Blahak et al. | 560/169 |
| 5,225,513 A | | 7/1993 | Scholz et al. | 528/53 |

FOREIGN PATENT DOCUMENTS

| | | |
|---|---|---|
| DE | A 25 23 633 | 5/1975 |
| WO | WO 01/00723 | 1/2001 |

* cited by examiner

*Primary Examiner*—Rabon Sergent
(74) *Attorney, Agent, or Firm*—Fernando A. Borrego; Howard and Howard

(57) ABSTRACT

Catalysts contain, as structural units, at least one tertiary amino group and at least one group which, after its decomposition, is capable of complexing or protonating the tertiary amino group.

9 Claims, No Drawings

CATALYSTS, IN PARTICULAR FOR THE PREPARATION OF POLYISOCYANATE POLYADDUCTS

The present invention relates to catalysts containing, as structural units, at least one tertiary amino group and at least one group which, after its decomposition, preferably its hydrolysis, is capable of complexing or protonating the tertiary amine, and the use of such catalysts. The present invention furthermore relates to processes for the preparation of polyisocyanate polyadducts, for example flexible integral, semirigid, rigid and flexible foams and microcellular foams, preferably flexible polyurethane foams, in particular for mattresses, upholstery or carpets for automotive or furniture applications, shoe soles and steering wheels, and products obtainable in this manner.

The preparation of polyisocyanate polyadducts by reacting polyisocyanates with compounds reactive toward isocyanates in the presence of catalysts which accelerate the reaction of the substances reactive toward isocyanates with isocyanates and, if required, blowing agents, additives and/or assistants is generally known.

As in the case of other plastics, polyisocyanate polyadducts are subject to aging processes which generally lead to a deterioration in the performance characteristics with increasing time. Major aging influences are, for example, hydrolysis, photooxidation and thermal oxidation, which lead to breaking of bonds in the polymer chains. In the case of polyisocyanate polyadducts, for example polyurethanes, also referred to below as PUR, in particular the action of moisture and to an even greater extent the combination of moisture and elevated temperatures results in hydrolytic cleavage of the urethane and urea bonds.

Not only is this cleavage evident from a significant deterioration in the performance characteristics but it also leads to the formation of primary aromatic amines, e.g. toluenediamine (TDA) and diaminodiphenylmethane (MDA), or primary aliphatic amines, for example hexamethylenediamine or isophoronediamine.

As has been found in tests, the amine formation is influenced by a number of parameters. In particular, high temperatures from 80° C. in combination with high atmospheric humidity lead to hydrolytic cleavage of the urethane and urea bonds. Such conditions are important for the material polyurethane in various applications.

A further parameter which significantly influences the formation of primary amines is the type and amount of the catalysts used. As was shown in various experiments, the catalysts contained in polyurethane systems and necessary for the urethanization and blowing reaction also catalyzed the hydrolytic cleavage reaction to a considerable extent. The presence of catalysts is thus a very decisive precondition for the hydrolysis of the urethane and urea bonds. Moreover, it was possible to show that the efficiency of the hydrolysis depends to a high degree on the activity and on the type of the catalyst and on whether the catalyst remains in the system or can migrate out of the material. In particular, tertiary amine catalysts having reactive functional groups, such as OH and $NH_2$, accelerate the amine formation by considerably lowering the activation energy for the cleavage reaction. The functional groups result in the incorporation of the catalysts into the PUR net work forming, and the products thus prepared have the advantage of less odor and fogging problems since the catalysts cannot escape by diffusion after the preparation of the final PUR product. The same applies to formulations containing polyols which were prepared using primary or secondary amines as initiator molecules and thus have catalytically active centers. Such polyols have increasingly been used recently. In the case of polyurethane parts which comprise such constituents and, in certain applications, are exposed to particular moist and warm conditions, the formation of primary aromatic amines as cleavage products cannot be ruled out. In the case of foams with amine catalysts which do not contain any functional groups capable of being incorporated, these catalysts on the other hand generally escape only a short time after the preparation of the final product or during the aging of the foams. In the case of such foams, moist and warm conditions lead to substantially lower aromatic amine contents.

The problems described at the outset consequently occur to a greater extent when using catalysts capable of being incorporated. These catalysts have at least one group reactive toward isocyanates and, owing to the reaction with the isocyanates, are covalently bonded in the PUR. As a result, the fogging behavior is improved since the catalyst does not evaporate from the PUR but its remaining in PUR leads to increased cleavage of the urethane groups.

It is an object of the present invention to provide polyisocyanate polyadducts which, after their preparation, have less tendency to cleavage of their urethane and urea bonds.

We have found that this object is achieved by the catalysts described at the outset.

The present invention therefore relates to catalysts, in particular those which catalyze the reaction of isocyanates with compounds reactive toward isocyanates, in particular hydroxyl groups, containing, as structural units, at least one tertiary amino group, preferably from 1 to 20, particularly preferably from 1 to 5 tertiary amino groups, and at least one group, preferably from 1 to 60, particularly preferably from 1 to 10 groups, which, after their decomposition, preferably their hydrolysis, are capable of complexing or protonating tertiary amino groups.

Owing to the tertiary amine in their starting structure, these novel catalysts catalyze the reaction of isocyanates with compounds reactive toward isocyanates, usually compounds including water, which have at least one hydroxyl, thiol and/or primary and/or secondary amino group, to give urethanes and/or ureas. This catalytic action of the starting structure is surprisingly not adversely affected by at least one additional hydrolyzable group.

After the catalysts have been able to display their catalytic activity in the process for the preparation of the polyisocyanate polyadducts the novel catalysts are increasingly decomposed, in particular hydrolyzed, during the subsequent storage of the polyisocyanate polyadducts or their use, in particular under moist and/or warm conditions, which also promote the cleavage of the urethane structures. The decomposition of the catalysts leads to the formation of at least one group which is capable of complexing or protonating the tertiary amino group of the catalyst. As a result of this complexing and/or protonation of the tertiary amino group, the catalytically active center is blocked and the catalyst thus deactivated. Since, as described at the outset, this catalytically active center also catalyzes the cleavage of the urethane structures the object, i.e. of avoiding cleavage, is achieved by the novel catalysts. The novel catalysts furthermore have the advantage that addition of compounds which deactivate the catalysts is superfluous during or after the preparation of the polyisocyanate polyadducts since the catalyst deactivates itself, for example during hydrolytic aging.

The catalysts are thus preferably used in polyisocyanate polyadducts both for catalysis in the preparation and for stabilization of the polyisocyanate polyadducts, in particular polyurethanes, to cleavage of the urethane and urea bonds, for example by blocking of amine catalysts by protonation of the catalytically active centers. Moreover, some forms of these catalysts in polyisocyanate polyadducts can be used for the reaction with amino groups, for example to give amides, in the polyisocyanate polyadducts. In addition, the catalysts can be converted during the aging into an ionic form (salt) which does not contribute to the fogging behavior of the system. The diffusion of amines from polyisocyanate polyadducts and the cleavage of the urethane bond, for example by amine catalysts present in the polyisocyanate polyadducts, can be reduced according to the invention.

Surprisingly, it was found that the hydrolyzable groups as a mixture with isocyanates or in compounds reactive toward isocyanates, for example polyether polyalcohols or polyester polyalkohols, are stable at room temperature, i.e. 25° C. It was also found that the novel catalysts, which are used in the preparation of polyisocyanate polyadducts, withstand the preparation process virtually without damage and are deactivated only to a minor extent during the processing procedure itself.

In general, groups which can be hydrolyzed and, after the hydrolysis, have at least one group which is capable of complexing or protonating tertiary amino groups may be present as the group which, after its decomposition, is capable of complexing or protonating the tertiary amino group or generally the tertiary amine. For example, esters and/or acid anhydrides, preferably carboxylic esters, sulfonic esters, carboxylic anhydrides, lactones, sultones, phosphoric esters and/or phosphonic esters, are suitable as such hydrolyzable groups. The acid groups present in free form after decomposition of the catalyst are capable of protonating or complexing and hence inhibiting the tertiary amine of the catalyst. Polymer-analogous catalysts, for example prepared from polyimine (reacted in a reaction analogous to a Michael addition with abovementioned substances, such as carboxylic esters), or catalysts whose free amino groups are reacted with corresponding polymer-analogous vinylcarboxylic esters and/or vinylcarboxylic anhydrides are also suitable.

In addition to the groups described above, the catalysts may furthermore also have at least one group reactive toward isocyanates, for example a hydroxyl, thiol and/or primary and/or secondary amino group, preferably a hydroxyl and/or primary and/or secondary amino group, particularly preferably a hydroxyl group.

The synthesis of catalytically active tertiary amines is generally known and preparation methods are described, for example, in Houben Weyl, volumes 11/1 and 11/2. For example, primary and secondary amines can be converted into tertiary amines by addition at double bonds. Thus, catalysts capable of being incorporated can be prepared from sodium allylate and secondary amines; for example, piperidine and sodium allylate react to give N-(3-hydroxypropyl) piperidine, which can be further esterified with a carboxylic acid or a carboxylic anhydride or a carbonyl chloride.

The preparation of the novel catalysts can also be carried out, for example, according to the generally known Michael addition by reacting primary and/or secondary amines with $\alpha,\beta$-unsaturated carbonyl compounds, for example anhydrides or esters or polyesters of methacrylic acid, itaconic acid, acrylic acid and/or maleic acid. Examples of suitable starting substances are methyl acrylate, ethyl acrylate, propyl acrylate, tert-butyl acrylate, phenyl acrylate, methyl methacrylate, dimethyl itaconate, trimethyl aconitate, triethyl aconitate, tributyl aconitate, ethyl methacrylate, propyl methacrylate, tert-butyl methacrylate, phenyl methacrylate, maleic anhydride, dimethyl maleate, diallyl maleate, dibutyl maleate, diethyl maleate, diethyl fumarate, dimethyl fumarate and/or dibutyl fumarate as carbonyl compounds and primary and secondary aliphatic or cycloaliphatic amines of 1 to 100 carbon atoms and 1 to 50 nitrogen atoms, e.g. morpholine, N-bis(3-dimethylaminopropyl)amine, piperidine, N-methylpiperazine, N-ethylpiperazine, N-propylpiperazine, pyrrolidine, N-aminoethylpiperazine, aminopropylimidazole, N-(2-aminoethyl)morpholine, 1,6-di (2-aminoethyl)piperazine, hexahydrotriazine, preferably those amines which also have 1–5 OH functions in addition to the amino function, e.g. 1-(2-hydroxyethyl)piperazine and 1,3,5-tri(2-hydroxyethyl)-hexahydrotriazine as primary and secondary amines.

The reaction can be carried out by generally known methods, which are known for the Michael addition.

Novel catalysts can also be prepared by reacting amines with other compounds having activated double bonds. Thus, amines can be coupled to unsaturated nitrites. After hydrolysis of the nitrile group, it can be converted into an ester group. Catalysts are also obtained by an addition reaction of a secondary amine with a vinylphosphonic ester, for example by reacting N-methylpiperazine and diethyl vinylphosphonate.

Those compounds which contain at least just as many or more groups which are decomposable and, after decomposition, have a complexing or protonating action as they have catalytically active centers are preferred.

A further synthesis route to novel catalysts is to react primary and secondary amines with alkylene oxides, e.g. ethylene oxide or propylene oxide. The hydroxyalkylamines thus formed can be esterified by a known method with carboxylic esters, carbonyl chlorides or carboxylic anhydrides.

The novel catalysts are preferably used in the generally known processes for the preparation of polyisocyanate polyadducts, preferably polyurethanes which may have isocyanurate and/or urea structures, particularly preferably flexible polyurethane foams.

The novel catalysts are used in the processes for the preparation of polyisocyanate polyadducts preferably in an amount of from 0.01 to 15, particularly preferably from 0.05 to 10, in particular from 0.05 to 5, % by weight, based on the weight of the polyisocyanate polyadduct. The novel catalysts have a molecular weight of from 100 to 5000, preferably from 100 to 3000 and particularly preferably from 100 to 2000 g/mol.

The preparation of polyisocyanate polyadducts usually by reacting polyisocyanates with compounds reactive toward isocyanates, in the presence of catalysts which accelerate the reaction of the substances reactive toward isocyanates with isocyanates and, if required, blowing agents, additives and/or assistants, is generally known. For example, compact or cellular, for example microcellular, flexible, semirigid or rigid polyurethane foams, thermoplastic polyurethanes or polyurethane elastomers can be prepared as polyisocyanate polyadducts by conventional processes using the novel catalysts. Preferably, the catalysts presented are used in processes for the preparation of polyurethane elastomers or foamed polyisocyanate polyadducts, preferably flexible polyurethane foams, in particular having a density of from 15 to 300, preferably from 15 to 120, kg/m$^3$, preferably mattresses and/or upholstery for furniture or carpets, particularly preferably hospital mattresses or flexible PUR foam articles which are exposed to moist and warm conditions, by reacting isocyanates with compounds reactive toward isocyanates, in the presence of catalysts, blowing agents and, if required, additives and/or assistants. These products, i.e. in particular the upholstery for furniture and/or carpets or the mattresses, are increasingly being treated with hot steam for cleaning or disinfection, with the result that the advantages according to the invention are especially pronounced especially in the case of these products.

The generally customary starting materials for the preparation of the polyisocyanate polyadducts are described by way of example below.

The isocyanates used may be the conventional aliphatic, cycloaliphatic, araliphatic and preferably aromatic organic isocyanates, preferably polyfunctional isocyanates, particularly preferably diisocyanates.

Specific examples are alkylene diisocyanates having 4 to 12 carbon atoms in the alkylene radical, such as dodecane 1,12-diiso-cyanate, 2-ethyltetramethylene 1,4-diisocyanate, 2-methyl-pentamethylene 1,5-diisocyanate, tetramethylene 1,4-diisocyanate and preferably hexamethylene 1,6-diisocyanate; cycloaliphatic diisocyanates, such as cyclohexane 1,3- and 1,4-diisocyanate and any desired mixtures of these isomers, 1-isocyanato-3,3,5-trimethyl-5-isocyanatomethylcyclohexane (isophorone diisocyanate), hexahydrotoluene 2,4- and 2,6-diisocyanate and the corresponding isomeren mixtures, dicyclohexylmethane 4,4'-, 2,2'- and 2,4'-diisocyanate and the corresponding isomer mixtures, aromatic di- and polyisocyanates, e.g. toluene 2,4- and 2,6-diisocyanate (TDI) and the corresponding isomer mixtures, diphenylmethane 4,4'-, 2,4'- and 2,2'-diisocyanate (MDI) and the corresponding isomer mixtures, naphthaline 1,5-diisocyanate (NDI), mixtures of diphenylmethane 4,4'- and 2,4'-diisocyanates, mixtures of NDI and diphenylmethane 4,4'- and/or 2,4'-diisocyanates, 3,3'-dimethyl-4,4'-diisocyanatobiphenyl (TOBI), mixtures of TOBI and diphenylmethane 4,4'- and/or 2,4'-diisocyanates, polyphenylpolymethylene polyisocyanates, mixtures of diphenylmethane 4,4'-, 2,4'- and 2,2'-diisocyanates and polyphenylpolymethylene polyisocyanates (crude MDI) and mixtures of crude MDI and toluene diisocyanates. The organic di- and polyisocyanates can be used individually or in the form of their mixtures.

Frequently, modified polyfunctional isocyanates, i.e. products which are obtained by chemical reaction of organic di- and/or polyisocyanates, are also often used. Examples are di- and/or polyisocyanates containing ester, urea, biuret, allophanate, carbodiimide, isocyanurate, uretdione and/or urethane groups. Suitable specific examples are: organic, preferably aromatic polyisocyanates containing urethane groups and having NCO contents of from 33.6 to 3.5, preferably from 31 to 12, % by weight, based on the total weight, modified diphenylmethane 4,4'-diisocyanate, modified diphenylmethane 4,4'- and 2,4'-diisocyanate mixtures, modified NDI, modified TOBI, modified crude MDI and/or toluene 2,4- or 2,6-diisocyanate, examples of di- or polyoxyalkylene glycols which may be used individually or as mixtures being diethylene and dipropylene glycol, polyoxyethylene, polyoxypropylene and polyoxypropylene polyoxyethylene glycols, -triols and/or tetrols. NCO-containing prepolymers having NCO contents of from 25 to 3.5, preferably from 21 to 14, % by weight, based on the total weight, prepared from, for example, polyester polyols and/or preferably polyether polyols and diphenylmethane 4,4'-diisocyanate, mixtures of diphenylmethane 2,4'- and 4,4'-diisocyanate, NDI, TOBI, mixtures of NDI and isomers of MDI, toluene 2,4- and/or 2,6-diisocyanates or crude MDI, are also suitable. Furthermore, liquid polyisocyanates containing carbodiimide groups and/or isocyanurate rings and having NCO contents of from 33.6 to 15, preferably from 31 to 21, % by weight, based on the total weight, for example based on diphenylmethane 4,4'-, 2,4'- and/or 2,2'-diisocyanate, NDI, HDI, TOBI and/or toluene 2,4- and/or 2,6-diisocyanate, have proven useful.

The modified polyisocyanates can, if required, be mixed with one another or with unmodified organic polyisocyanates, e.g. diphenylmethane 2,4'- or 4,4'-diisocyanate, NDI, TOBI, crude MDI or toluene 2,4- and/or 2,6-diisocyanate.

Preferably used isocyanates in the novel mixtures or processes are diphenylmethane 4,4'-, 2,4'- and/or 2,2'-diisocyanate, toluene 2,4- and/or 2,6-diisocyanate, NDI, hexamethylene diisocyanate and/or isophorone diisocyanate, it being possible to use these isocyanates both in any desired mixtures and, as described above, in modified form.

Compounds which are reactive toward isocyanates and usually have at least two reactive hydrogen atoms, usually hydroxyl and/or amino groups, and which can expediently be used are those having a functionality of from 2 to 8, preferably from 2 to 6, and a molecular weight of, usually, from 60 to 10 000. For example, polyether polyamines and/or preferably polyols selected from the group consisting of the polyether polyols, polyester polyols, polythioether polyols, polyesteramides, hydroxyl-containing polyacetals and hydroxyl-containing aliphatic polycarbonates or mixtures of at least two of said polyols have proven useful. Polyester polyols and/or polyether polyols which can be prepared by known processes are preferably used.

The polyester polyols preferably have a functionality of from 2 to 4, in particular from 2 to 3, and a molecular weight of, usually, from 500 to 3 000, preferably from 1 200 to 3 000, in particular from 1 800 to 2 500.

The polyether polyols have a functionality of, preferably, from 2 to 6 and usually molecular weights of from 500 to 8 000.

Other examples of suitable polyether polyols are polymer-modified polyether polyols, preferably graft polyether polyols, in particular those based on styrene and/or acrylonitrile, which can be prepared by in situ polymerization of acrylonitrile, styrene or preferably mixtures of styrene and acrylonitrile.

The polyether polyols as well as the polyester polyols can be used individually or in the form of mixtures. Furthermore, they can be mixed with the graft polyether polyols or polyester polyols and hydroxyl-containing polyester amides, polyacetals and/or polycarbonates.

The polyol components used are high-functionality polyols, in particular polyether polyols based on high-functionality alcohols, sugar alcohols and/or saccharides, as initiator molecules for rigid polyurethane foams which may have isocyanurate structures, and difunctional and/or trifunctional polyether polyols and/or polyester polyols based on glycerol and/or trimethylolpropane and/or glycols as initiator molecule or alcohols to be esterified for flexible foams. The polyether polyols are prepared by a known technology. Suitable alkylene oxides for the preparation of the polyols are, for example, tetrahydrofuran, 1,3-propylene oxide, 1,2- and 2,3-butylene oxide, styrene oxide and preferably ethylene oxide and 1,2-propylene oxide. The alkylene oxides can be used individually, alternately in succession or as mixtures. Preferably used alkylene oxides are those which lead to primary hydroxyl groups in the polyol. Particularly preferably used polyols are those which have been alkoxylated with ethylene oxide at the end of the alkoxylation and thus have primary hydroxyl groups. For the preparation of thermoplastic polyurethanes, polyols having a functionality of from 2 to 2.2 and no crosslinking agents are preferably used.

Furthermore, chain extenders and/or crosslinking agents can be used as compounds reactive toward isocyanates. For example, for modifying the mechanical properties, e.g. the hardness, of the polyisocyanate polyadducts prepared using these substances, the addition of chain extenders, crosslinking agents or, if required, also mixtures thereof may prove advantageous. The chain extenders and/or crosslinking agents used may be water, diols and/or triols having molecular weights of from 60 to <500, preferably from 60 to 300. For example, aliphatic, cycloaliphatic and/or araliphatic diols of 2 to 14, preferably 4 to 10, carbon atoms, e.g. ethylene glycol, 1,3-propanediol, 1,10-decanediol, o-, m- and p-dihydroxycyclohexane, diethylene glycol, dipropylene glycol and preferably 1,4-butanediol, 1,6-hexanediol and bis(2-hydroxyethyl)-hydroquinone, triols, such as 1,2,4- and 1,3,5-trihydroxycyclohexane, glycerol and trimethylolpropane, and low molecular weight hydroxyl-containing polyalkylene oxides based on ethylene oxide and/or 1,2-propylene oxide and diols and/or triols are suitable as initiator molecules.

If chain extenders, crosslinking agents or mixtures thereof are used for the preparation of the polyisocyanate polyadducts, they are expediently employed in an amount of from 0 to 20, preferably from 2 to 8, % by weight, based on the weight of the compounds reactive toward the isocyanates, thermoplastic polyurethanes preferably being prepared without crosslinking agents.

In addition to the novel catalysts, generally customary compounds may be used as catalysts, for example organic amines, e.g. triethylamine, triethylenediamine, tributylamine, dimethylbenzylamine, N,N,N',N'-tetramethylethylenediamine, N,N,N',N'-tetramethylbutanediamine, N,N,N',N'-tetramethylhexane-1,6-diamine, dimethylcyclohexylamine, pentamethyldipropylenetriamine, pentamethyldiethylenetriamine, 3-methyl-6-dimethylamino-3-azapentol, dimethylaminopropylamine, 1,3-bisdimethylaminobutane, bis(2-dimethylaminoethyl) ether, N-ethylmorpholine, N-methylmorpholine, N-cyclohexylmorpholine, 2-dimethylamnoethoxyethanol, dimethylethanolamine, tetramethylhexamethylenediamine, dimethylamino-N-methyl-ethanolamine, N-methylimidazole, N-(3-aminopropyl)imidazole, N-(3-aminopropyl)-2-methylimidazole, 1-(2-hydroxyethyl) imidazole, N-formyl-N,N'-dimethylbutylenediamine, N-dimethylaminoethylmorpholine, 3,3'-bisdimethylaminodi-n-propylamine and/or 2,2'-dipiperazinediisopropyl ether, dimethylpiperazine, N,N'-bis(3-aminopropyl) ethylenediamine and/or tris(N,N-dimethylaminopropyl)-s-hexahydrotriazine, or mixtures containing at least two of said amines, higher molecular weight tertiary amines, as described, for example, in DE-A 28 12 256, also being possible. Furthermore, conventional organic metal compounds may be used as catalysts for this purpose, preferably organic tin compounds, such as tin(II) salts of organic carboxylic acids, e.g. tin(II) acetate, tin(II) octanoate, tin(II) ethylhexanoate and tin(II) laurate, and the dialkyltin(IV) salts of organic carboxylic acids, e.g. dibutyltin diacetate, dibutyltin dilaurate, dibutyltin maleate and dioctyltin diacetate. Preferably, tertiary aliphatic and/or cycloaliphatic amines may be present in the mixtures, particularly preferably triethylenediamine, bis(dimethylaminoethyl) ether or 2-(2-dimethylaminoethoxy)ethanol.

Generally known blowing agents, e.g. substances which have a boiling point under atmospheric pressure of from 40° C. to 120° C., gases and/or solid blowing agents and/or water can, if required, be used in conventional amounts as blowing agents, preferably for the preparation of foamed polyurethanes, for example carbon dioxide, alkanes and/or cycloalkanes, such as isobutane, propane, n-butane, isobutane, n-pentane and cyclopentane, ethers, for example diethyl ether, methyl isobutyl ether and dimethyl ether, nitrogen, oxygen, helium, argon, nitrous oxide, halogenated hydrocarbons and/or partially halogenated hydrocarbons, such as trifluoromethane, monochlorotrifluoroethane, difluoroethaane, pentafluoroethane, tetrafluoroethane or mixtures which contain at least two of the blowing agents stated by way of example.

Examples of assistants and/or additives are surfactants, foam stabilizers, cell regulators, fillers, dyes, pigments, flameproofing agents, hydrolysis stabilizers and fungistatic and bacteriostatic substances.

Usually, the organic polyisocyanates and the compounds reactive toward isocyanates and having a molecular weight of from 60 to 10 000 g/mol are reacted in amounts such that the ratio of the number of equivalents of NCO groups of the polyisocyanates to the sum of the reactive hydrogen atoms of the compounds reactive toward isocyanates is from 0.5:1 to 5:1, preferably from 0.5:1 to 3:1, preferably from 0.5:1 to 2:1 and in particular from 0.5:1 to 1.5:1.

It may be advantageous if the polyurethanes contain at least some of the isocyanurate groups in bound form. In these cases a ratio of NCO groups of the polyisocyanates to the sum of the reactive hydrogen atoms of from 1.5:1 to 60:1, preferably from 1.5:1 to 8:1, can preferably be chosen.

The polyisocyanate polyadducts can be prepared, for example, by the one-shot process or the known prepolymer process, for example with the aid of the high pressure or low pressure technique in open or closed molds, reaction extruders or belt units.

Preferably, foamed polyisocyanate polyadducts, for example foamed polyurethanes and/or polyisocyanates are prepared with the novel mixtures.

It has proven advantageous to prepare the polyisocyanate polyadducts by the two-component process and to combine the compounds reactive toward isocyanates and, if required, the catalysts, blowing agents and/or assistants and/or additives in the A component and to use the isocyanates and catalysts and/or blowing agents as the B component.

The examples which follow illustrate the invention.

EXAMPLES

Example 1

Synthesis of an Incorporatable Catalyst from 1-(2-hydroxyethyl)piperazine and tert-butyl acrylate In a 500 ml four-necked flask with reflux condenser, dropping funnel (with pressure equilibration) and internal thermometer, 65.1 g of 1-(2-hydroxyethyl)piperazine were dissolved in 75 ml of methanol. 64.09 g of tert-butyl acrylate were added dropwise to the solution in the course of 60 minutes while stirring. Heating was carried out to 60° C. and stirring was effected for 2 hours at this temperature. The mixture was then cooled to room temperature. The product was left to stand for 24 hours. The methanol and the excess tert-butyl acrylate were then distilled off under reduced pressure via a rotary evaporator.

Example 2

Synthesis of a Catalyst from 1-(2-hydroxyethyl) piperazine and methyl acrylate In a 500 ml four-necked flask with a reflux condenser, dropping funnel (with pressure equilibration) and internal thermometer, 80 g of 1-(2-hydroxyethyl)piperazine were dissolved in 75 ml of methanol. 52.9 g of methyl acrylate were added dropwise to the solution while stirring. Heating was carried out to 60° C. and stirring was effected for 2 hours at this temperature. The product was left to stand for 24 hours. The methanol and the excess methyl acrylate were then distilled off under reduced pressure via a rotary evaporator.

Example 3

Synthesis of a Catalyst from 1-(2-hydroxyethyl) piperazine and dimethyl maleate

In a 500 ml four-necked flask with a reflux condenser, dropping funnel (with pressure equilibration), and internal thermometer, 65 g of 1-(2-hydroxyethyl)piperazine were dissolved in 75 ml of methanol. 71.96 g of dimethyl maleate were added dropwise to the solution while stirring. After the addition of about 50% of the dimethyl maleate, a whitish precipitate settled out.

Example 4

Synthesis of a Catalyst from methyl acrylate and piperidine

In a 500 ml four-necked flask with a reflux condenser, dropping funnel (with pressure equilibration) and internal thermometer, 93.65 g of piperidine were dissolved in 75 ml of methanol. 75.76 g of methyl acrylate were added dropwise to the solution while stirring. The product was left to stand for 24 hours. The methanol and the excess methyl acrylate were then distilled off under reduced pressure via a rotary evaporator.

Example 5

Synthesis of a Catalyst from dimethyl maleate and N,N-bis(3-dimethylaminopropyl)amine In a 500 ml four-necked flask with a reflux condenser, dropping funnel (with pressure equilibration) and internal thermometer, 84.77 g of N,N-bis(3-dimethylaminopropyl) amine were dissolved in 75 ml of methanol. 65.23 g of dimethyl maleate were added dropwise to the solution while stirring. The product was then heated to 60 for 2 hours. Stirring was then carried out for 24 hours at room temperature. The methanol was then distilled off under reduced pressure via a rotary evaporator.

Example 6

Synthesis of a Catalyst from morpholine and methyl acrylate

In a 500 ml four-necked flask with a reflux condenser, dropping funnel (with pressure equilibration), and internal thermometer, 95.83 g of morpholine were dissolved in 150 ml of methanol. 86.09 g of methyl acrylate were added dropwise to the solution while stirring. Stirring was carried out at room temperature. The methanol and the excess morpholine were then distilled off under reduced pressure via a Vigreux column.

Example 7

Synthesis of a Catalyst from aminopropylimidazole and methyl acrylate

In a 500 ml four-necked flask with a reflux condenser, dropping funnel (with pressure equilibration) and internal thermometer, 62.58 g of aminopropylimidazole were dissolved in 75 ml of methanol. 107.6 g of methyl acrylate were added dropwise to the solution while stirring. The mixture was left to stand for 48 hours. The methanol and the excess methyl acrylate were then distilled off under reduced pressure via a Vigreux column.

Example 8

Synthesis of a Catalyst from methyl acrylate and N-(2-aminoethyl)morpholine

In a 500 ml four-necked flask with a reflux condenser, dropping funnel (with pressure equilibration) and internal thermometer, 65.1 g of N-(2-aminoethyl)morpholine were dissolved in 75 ml of methanol. 107.6 g of methyl acrylate were added dropwise to the solution while stirring. The mixture was left to stand for 48 hours. The methanol and the excess methyl acrylate were then distilled off under reduced pressure via a Vigreux column.

Example 9

Synthesis of a Catalyst from methyl acrylate and N,N-bis(3-dimethylaminopropyl)amine In a 500 ml four-necked flask with a reflux condenser, dropping funnel (with pressure equilibration) and internal thermometer, 93.65 g of N,N-bis(3-dimethylaminopropyl) amine were dissolved in 75 ml of methanol. 47.33 g of methyl acrylate were added dropwise to the solution while stirring.

Stirring was carried out for 24 hours at room temperature. The methanol and the excess methyl acrylate were then distilled off under reduced pressure via a rotary evaporator.

Example 10

Preparation of a Comparative Flexible Foam 750 g of polyol component were mixed with 361 g of isocyanate component (index 90) and the foaming material was transferred to an aluminum mold (40 cm×40 cm×10 cm) thermostated at 50° C., the components having the following compositions:

Polyol Component:

97 parts by weight of Lupranol® 2090, molecular weight: 6 000, OH number: 28 (Elastogran GmbH)

3 parts by weight of Lupranol® 2047, molecular weight 4 000, OH number: 42 (Elastogran GmbH)

3.31 parts by weight of water 0.6 part by weight of 2-(2-dimethylaminoethoxy)ethanol 0.5 part by weight of Tegostab® B8631 (Goldschmidt)

0.8 part by weight of aminopropylimidazole (BASF Aktiengesellschaft)

Isocyanate Component:

A mixture of 42 parts of Lupranat® M 20 W (polymer MDI, Elastogran GmbH) and a mixture of 2,4'- and 4,4'-MDI (11 parts of Lupranat® ME and 47 parts of Lupranat® MI, Elastogran GmbH)

After 5 minutes the prepared flexible foam was removed from the mold. The characterization of this foam and the reaction parameters (recorded for a cup foam having the same formulation and same index) are shown in table 1.

Example 11

Perparation of a Flexible Foam using the Catalyst from Example 3

750 g of polyol component were mixed with 360 g of isocyanate component (index 90) and the foaming material was transferred to an aluminum mold (40 cm×40 cm×10 cm) thermostated at 50° C., the components having the following compositions:

Polyol Component 97 parts by weight of Lupranol® 2090, molecular weight: 6 000, OH number: 28 (Elastogran GmbH)

3 parts by weight of Lupranol® 2047, molecular weight 4 000, OH number: 42 (Elastogran GmbH)

3.31 parts by weight of water 0.6 part by weight of 2-(2-dimethylaminoethoxy)ethanol 0.5 part by weight of Tegostab® B8631 (Goldschmidt)

0.8 part by weight of catalyst from example 3

Isocyanate Component

A mixture of 42 parts of Lupranat® M 20 W (polymer MDI, Elastogran GmbH) and a mixture of 2,4'- and 4,4'-MDI (11 parts of Lupranat® ME and 47 parts of Lupranat® MI, Elastogran GmbH)

After 5 minutes, the prepared flexible foam was removed from the mold. The properties of this foam and the reaction parameters (recorded for a cup foam having the same formulation and same index) are compared with those of the foam from example 10 in table 1.

In order to simulate conditions as in abovementioned special applications in which polyurethane materials are exposed to hydrolytic stresses and to obtain foams having measurable contents of aromatic amines, the storage under moist and warm conditions was carried out. For this purpose, in each case sample cubes having an edge length of 3 cm were stored at 90° C. and 90% relative humidity for 72 hours in a conditioned chamber. The extraction of the aromatic amines was carried out by means of a method developed by Prof. Skarping, University of Lund. For this purpose, the foam was pressed out 10 times in 10 ml of acetic acid (w=1% by weight). The acetic acid was transferred to a 50 ml volumetric flask while the foam sample was compressed. The procedure was repeated twice and the volumetric flask then made up to the mark with acetic acid (w=1% by weight). The MDA content of the combined extracts was then determined by means of capillary electrophoresis with UV detection (apparatus type: Biofocus 3 000, measurement of the peak areas and comparison with imidazole as internal standard). The MDA contents shown in table 1 correspond to the absolute contents of the resulting MDA in the PUR foam.

TABLE 1

Foam characterization and reaction parameters

| | Foam from example 10 | Foam from example 11 |
|---|---|---|
| Cream time | 14 s | 14 s |
| Gel time | 85 s | 110 s |
| Rise time | 127 s | 155 s |
| Free-foamed density | 45.4 g/l | 44.3 g/l |
| CS | 3.7% | 4.9% |
| CS after storage under moist and warm conditions | 11.6% | 7.3% |
| Δ CS | 7.9% | 2.4% |
| RES | 68% | 63% |
| RES after storage under moist and warm conditions | 50% | 57% |
| Δ RES | 18% | 6% |
| CR | 6.0 kPa | 5.8 kPa |
| CR after storage under moist and warm conditions | 4.2 kPA | 5.0 kPa |
| Δ CR | 1.8 kPa | 0.8 kPa |
| 4,4'-MDA | <1 ppm | <1 ppm |
| 2,4'-MDA | <1 ppm | <1 ppm |
| 4,4'-MDA after storage under moist and warm conditions | 554 ppm | 100 ppm |
| 2,4'-MDA after storage under moist and warm conditions | 828 ppm | 208 ppm |

The abbreviations shown in the table are:
CS: Compression set, measured according to DIN EN ISO 1856
RES: Resilience, measured according to DIN 53573
CR: Crushing resistance, measured according to DIN EN ISO 3386 at 40% compression of the test specimen As shown by the data in table 1, the novel catalyst leads to a foaming reaction which is only insignificantly slower than that using the conventional incorporatable catalyst aminopropylimidazole. The mechanical properties (CS, RES, CR), too, are only slightly different with the novel catalyst in the unaged state compared with the comparative foam. However, after storage under moist and warm conditions, these values are substantially poorer in the case of the comparative foam than in the case of the foam which is prepared according to the invention and for which the mechanical values change to a far lesser extent. After storage under moist and warm conditions, moreover, substantially less MDA is found in the novel foam than in the comparative foam.

Example 12

Synthesis of a Catalyst from 1-(2-hydroxyethyl) piperazine and dimethyl itaconate In a 500 ml four-necked flask with a reflux condenser, dropping funnel (with pressure equilibration) and internal thermometer, 60 g of 1-(2-hydroxyethyl)piperazine were dissolved in 60 ml of methanol. 72.88 g of dimethyl itaconate were added dropwise to the solution while stirring. Heating was carried out to 70° C. and stirring was effected for 6 hours under reflux at this temperature. The methanol was then distilled off under reduced pressure by a rotary evaporator.

Example 13

Perparation of a Flexible Foam using the Catalyst from Example 12

750 g of polyol components were mixed with 365 g of isocyanate component (index 90) and the foaming material was transferred to an aluminum mold (40 cm×40 cm×10 cm), thermostated at 50° C., the components having the following compositions:

Polyol Component:

97 parts by weight of Lupranol® 2090, molecular weight: 6000, OH number: 28 (Elastogran GmbH)

3 parts by weight of Lupranol® 2047, molecular weight: 4000, OH number: 42 (Elastogran GmbH)

3.31 parts by weight of water 0.6 part by weight of 2-(2-dimethylaminoethoxy)ethanol 0.5 part by weight of Tegostab® B8631 (Goldschmidt)

0.8 part by weight of catalyst from example 12

Isocyanate Component:

Mixture of 42 parts of Lupranat® M 20 W (polymer MDI, Elastogran GmbH) and a mixture of 2,4'- and 4,4'-MDI (11 parts of Lupranat® ME and 47 parts of Lupranat® MI, Elastogran GmbH)

After 5 minutes, the prepared flexible foam was removed from the mold. The properties of this foam and the reaction parameters (recorded for a cup foam having the same formulation and same index) are compared with those of the foam from example 10 in table 2.

In order to simulate conditions as in abovementioned special applications in which polyurethane materials are exposed to hydrolytic stresses and to obtain foams having measurable contents of aromatic amines, storage under moist and warm conditions and extraction of foam samples as described under example 11 were carried out. The MDA content of the combined extracts was then determined by means of capillary electrophoresis with UV detection (apparatus type: Biofocus 3000, measurement of the peak areas and comparison with imidazole as internal standard). The MDA contents shown in table 2 correspond to the absolute contents of the resulting MDA in the PUR foam.

TABLE 2

Foam characterization and reaction parameters

| | Foam from example 10 | Foam from example 13 |
|---|---|---|
| Cream time | 14 s | 16 s |
| Gel time | 85 s | 95 s |
| Rise time | 127 s | 167 s |
| Free-foamed density | 45.4 g/l | 42.5 g/l |
| CS | 3.7% | 4.6% |
| CS after storage under moist and warm conditions | 11.6% | 7.6% |
| Δ CS | 7.9% | 3.0% |
| RES | 68% | 65% |
| RES after storage under moist and warm conditions | 50% | 61% |
| Δ RES | 18% | 4% |
| CR | 6.0 kPa | 7.7 kPa |
| CR after storage under moist and warm conditions | 4.2 kPA | 6.8 kPa |
| Δ CR | 1.8 kPa | 0.9 kPa |
| Fogging | 0.22 mg | 0.29 mg |
| 4,4'-MDA | <1 ppm | <1 ppm |
| 2,4'-MDA | <1 ppm | <1 ppm |
| 4,4'-MDA after storage under moist and warm conditions | 554 ppm | 62 ppm |
| 2,4'-MDA after storage under moist and warm conditions | 828 ppm | 147 ppm |

The abbreviations used in the table are:
CS: Compression set, measured according to DIN EN ISO 1856
RES: Resilience, measured according to DIN 53573
CR: Crushing resistance, measured according to DIN EN ISO 3386 at 40% compression of the test specimen As shown by the data in table 2, the novel catalyst leads to a foaming reaction which is only insignificantly slower than that using the conventional incorporatable catalyst aminopropylimidazole. The mechanical properties (CS, RES, CR), too, are only slightly different with the novel catalyst in the unaged state compared with the comparative foam. However, after storage under moist and warm conditions these values are substantially poorer in the case of the comparative foam than in the case of the foam which is prepared according to the invention and for which the mechanical values change to a far lesser extent. After storage under moist and warm conditions, moreover, substantially less MDA is found in the novel foam than in the comparative foam.

Example 14

Synthesis of a Catalyst from 1-(2-hydroxyethyl) piperazine and dibutyl maleate

In a 500 ml four-necked flask with a reflux condenser, dropping funnel (with pressure equilibration) and internal thermometer, 40 g of 1-(2-hydroxyethyl)piperazine were dissolved in 40 ml of methanol. 70.14 g of dibutyl maleate were added dropwise to the solution while stirring, the temperature being kept at about 35° C. The reaction mixture was left to stand for 24 hours. The methanol was then distilled off under reduced pressure by a rotary evaporator.

Example 15

Perparation of a Flexible Foam using the Catalyst from Example 14

750 g of polyol component were mixed with 365 g of isocyanate component (index 90) and the foaming material was transferred to an aluminum mold (40 cm×40 cm×10 cm) thermostated at 50° C., the components having the following compositions:

Polyol Component:

97 parts by weight of Lupranol® 2090, molecular weight: 6000, OH number: 28 (Elastogran GmbH)

3 parts by weight of Lupranol® 2047, molecular weight 4000, OH number: 42 (Elastogran GmbH)

3.31 parts by weight of water 0.6 part by weight of 2-(2-dimethylaminoethoxy)ethanol 0.5 part by weight Tegostab® B8631 (Goldschmidt)

0.8 part by weight of catalyst from example 14

Isocyanate Component:

Mixture of 42 parts of Lupranat® M 20 W (polymer MDI, Elastogran GmbH) and a mixture of 2,4'- and 4,4'-MDI (11 parts of Lupranat® ME and 47 parts of Lupranat® MI, Elastogran GmbH)

After 5 minutes, the prepared flexible foam was removed from the mold. The properties of this foam and the reaction parameters (recorded for a cup foam having the same formulation and same index) are compared with those of the foam from example 10 in table 3.

In order to simulate conditions as in abovementioned special applications in which polyurethane materials are exposed to hydrolytic stresses and to obtain foams having measurable contents of aromatic amines, storage under moist and warm conditions and extraction of foam samples as described under example 11 were carried out. The MDA content of the combined extracts was then determined by means of capillary electrophoresis with UV detection (apparatus type: Biofocus 3000, measurement of the peak areas and comparison with imidazole as internal standard). The MDA contents shown in table 3 correspond to the absolute contents of the resulting MDA in the PUR foam.

TABLE 3

Foam characterization and reaction parameters

| | Foam from example 10 | Foam from example 15 |
|---|---|---|
| Cream time | 14 s | 21 s |
| Gel time | 85 s | 100 s |
| Rise time | 127 s | 165 s |

TABLE 3-continued

Foam characterization and reaction parameters

| | Foam from example 10 | Foam from example 15 |
|---|---|---|
| Free-foamed density | 45.4 g/l | 43.1 g/l |
| CS | 3.7% | 4.6% |
| CS after storage under moist and warm conditions | 11.6% | 8.4% |
| Δ CS | 7.9% | 3.8% |
| RES | 68% | 62% |
| RES after storage under moist and warm conditions | 50% | 56% |
| Δ RES | 18% | 6% |
| CR | 6.0 kPa | 6.3 kPa |
| CR after storage under moist and warm conditions | 4.2 kPA | 4.9 kPa |
| Δ CR | 1.8 kPa | 1.4 kPa |
| Fogging | 0.22 mg | 0.25 mg |
| 4,4'-MDA | <1 ppm | <1 ppm |
| 2,4'-MDA | <1 ppm | <1 ppm |
| 4,4'-MDA after storage under moist and warm conditions | 554 ppm | 214 ppm |
| 2,4'-MDA after storage under moist and warm conditions | 828 ppm | 401 ppm |

The abbreviations used in the table are:
CS: Compression set, measured according to DIN EN ISO 1856
RES: Resilience, measured according to DIN 53573
CR: Crushing resistance, measured according to DIN EN ISO 3386 at 40% compression of the test specimen As shown by the data in table 3, the novel catalyst leads to a foaming reaction which is only insignificantly slower than that using the conventional incorporatable catalyst aminopropylimidazole. The mechanical properties (CS, RES, CR), too, are only slightly different with the novel catalyst in the unaged state compared with the comparative foam. However, after storage under moist and warm conditions these values are substantially poorer in the case of the comparative foam than in the case of the foam which is prepared according to the invention and for which the mechanical values change to a far lesser extent. After storage under moist and warm conditions, moreover, substantially less MDA is found in the novel foam than in the comparative foam.

Example 16

Synthesis of a Catalyst from 1-(2-hydroxyethyl) piperazine and diethyl maleate In a 500 ml four-necked flask with a reflux condenser, dropping funnel (with pressure equilibration) and internal thermometer, 30 g of 1-(2-hydroxyethyl)piperazine were dissolved in 30 ml of methanol. 39.68 g of diethyl maleate were added dropwise to the solution while stirring, the temperature being kept at about 35° C. The reaction mixture was left to stand for 24 hours. The methanol was then distilled off under reduced pressure by a rotary evaporator, the product crystallizing out.

Example 17

Perparation of a Flexible Foam using the Catalyst from Example 16

750 g of polyol component and 365 g of isocyanate component (index 90) were mixed and the foaming material was transferred to an aluminum mold (40 cm×40 cm×10 cm) thermostated at 50° C., the components having the following compositions:

Polyol Component:

97 parts by weight of Lupranol® 2090, molecular weight: 6000, OH number: 28 (Elastogran GmbH)

3 parts by weight of Lupranol® 2047, molecular weight 4000, OH number: 42 (Elastogran GmbH)

3.31 parts by weight of water 0.6 part by weight of 2-(2-dimethylaminoethoxy)ethanol 0.5 part by weight of Tegostab® B8631 (Goldschmidt)

0.8 part by weight of catalyst from example 16

Isocyanate Component:

Mixture of 42 parts of Lupranat® M 20 W (polymer MDI, Elastogran GmbH) and a mixture of 2,4'- and 4,4'-MDI (11 parts of Lupranat® ME and 47 parts of Lupranat® MI, Elastogran GmbH)

After 5 minutes the prepared flexible foam was removed from the mold. The properties of this foam and the reaction parameters (recorded for a cup foam having the same formulation and same index) are compared with those of the foam from example 10 in table 4.

In order to simulate conditions as in abovementioned special applications in which polyurethane materials are exposed to hydrolytic stresses and to obtain foams having measurable contents of aromatic amines, storage under moist and warm conditions and extraction of foam samples as described under example 11 were carried out. The MDA content of the combined extracts was then determined by means of capillary electrophoresis with UV detection (apparatus type: Biofocus 3000, measurement of the peak areas and comparison with imidazole as internal standard). The MDA contents shown in table 4 correspond to the absolute contents of the resulting MDA in the PUR foam.

TABLE 4

Foam characterization and reaction parameters

| | Foam from example 10 | Foam from example 17 |
|---|---|---|
| Cream time | 14 s | 21 s |
| Gel time | 85 s | 101 s |
| Rise time | 127 s | 163 s |
| Free-foamed density | 45.4 g/l | 44.3 g/l |
| CS | 3.7% | 4.4% |
| CS after storage under moist and warm conditions | 11.6% | 8.4% |
| Δ CS | 7.9% | 4% |
| RES | 68% | 66% |
| RES after storage under moist and warm conditions | 50% | 57% |
| Δ RES | 18% | 9% |
| CR | 6.0 kPa | 6.3 kPa |
| CR after storage under moist and warm conditions | 4.2 kPa | 5.0 kPa |
| Δ CR | 1.8 kPa | 1.3 kPa |
| Fogging | 0.22 mg | 0.20 mg |
| 4,4'-MDA | <1 ppm | <1 ppm |
| 2,4'-MDA | <1 ppm | <1 ppm |
| 4,4'-MDA after storage under moist and warm conditions | 554 ppm | 151 ppm |
| 2,4'-MDA after storage under moist and warm conditions | 828 ppm | 299 ppm |

The abbreviations shown in the table are:
CS: Compression set, measured according to DIN EN ISO 1856
RES: Resilience, measured according to DIN 53573
CR: Crushing resistance, measured according to DIN EN ISO 3386 at 40% compression of the test specimen As shown by the data in table 4, the novel catalyst leads to a foaming reaction which is only insignificantly slower than that using the conventional incorporatable catalyst aminopropylimidazole. The mechanical properties (CS, RES, CR), too, are only slightly different with the novel catalyst in the unaged state compared with the comparative foam. However, after storage under moist and warm conditions, these values are substantially poorer in the case of the comparative foam than in the case of the foam which is prepared according to the invention and for which the mechanical values change to a far lesser extent. After storage under moist and warm conditions, moreover, substantially less MDA is found in the novel foam than in the comparative foam.

Example 18

Perparation of a Flexible Foam using the Catalyst from Example 12 in Addition to aminopropylimidazole 750 g of polyol component were mixed with 363 g of isocyanate component (index 90) and the foaming material was transferred to an aluminum mold (40 cm×40 cm×10 cm) thermostated at 50° C., the components having the following composition:

Polyol Component:

97 parts by weight of Lupranol® 2090, molecular weight: 6000, OH number: 28 (Elastogran GmbH)

3 parts by weight of Lupranol® 2047, molecular weight 4000, OH number: 42 (Elastogran GmbH)

3.31 parts by weight of water 0.6 part by weight of 2-(2-dimethylaminoethoxy)ethanol 0.5 part by weight of Tegostab® B8631 (Goldschmidt)

0.8 part by weight of aminopropylimidazole (BASF Aktiengesellschaft)

0.8 part by weight of catalyst from example 12

Isocyanate Component:

Mixture of 42 parts of Lupranat® M 20 W (polymer MDI, Elastogran GmbH) and a mixture of 2,4'- and 4,4'-MDI (11 parts of Lupranat® ME and 47 parts of Lupranat® MI, Elastogran GmbH)

After 5 minutes, the prepared flexible foam was removed from the mold. The properties of this foam and the reaction parameters (recorded for a cup foam having the same formulation and same index) are compared with those of the foam from example 10 in table 5.

In order to simulate conditions as in abovementioned special applications in which polyurethane materials are exposed to hydrolytic stresses and to obtain foams having measurable contents of aromatic amines, storage under moist and warm conditions and extraction of foam samples as described under example 11 were carried out. The MDA content of the combined extracts was then determined by means of capillary electrophoresis with UV detection (apparatus type: Biofocus 3000, measurement of the peak areas and comparison with imidazole as internal standard). The MDA contents shown in table 5 correspond to the absolute contents of the resulting MDA in the PUR foam.

TABLE 5

Foam characterization and reaction parameters

| | Foam from example 10 | Foam from example 10 |
|---|---|---|
| Cream time | 14 s | 13 s |
| Gel time | 85 s | 74 s |
| Rise time | 127 s | 122 s |
| Free-foamed density | 45.4 g/l | 43.0 g/l |
| CS | 3.7% | 3.8% |
| CS after storage under moist and warm conditions | 11.6% | 6.7% |
| Δ CS | 7.9% | 2.9% |
| RES | 68% | 67% |
| RES after storage under moist and warm conditions | 50% | 59% |
| Δ RES | 18% | 8% |
| CR | 6.0 kPa | 5.8 kPa |
| CR after storage under moist and warm conditions | 4.2 kPA | 5.0 kPa |
| Δ CR | 1.8 kPa | 0.8 kPa |
| Fogging | 0.22 mg | 0.19 mg |
| 4,4'-MDA | <1 ppm | <1 ppm |
| 2,4'-MDA | <1 ppm | <1 ppm |
| 4,4'-MDA after storage under moist and warm conditions | 554 ppm | 122 ppm |
| 2,4'-MDA after storage under moist and warm conditions | 828 ppm | 264 ppm |

The abbreviations shown in the table are:
CS: Compression set, measured according to DIN EN ISO 1856
RES: Resilience, measured according to DIN 53573
CR: Crushing resistance, measured according to DIN EN ISO 3386 at 40% compression of the test specimen As shown by the data in table 5, the reaction rate of the polyurethane system can be increased in comparison with the sole use of the novel catalyst (cf. example 13) by combining the novel catalyst with another catalyst. The mechanical properties (CS, RES, CR), are only slightly different with the novel catalyst in the unaged state compared with the comparative foam without novel catalyst. However, after storage under moist and warm conditions, these values are substantially poorer in the case of the comparative foam than in the case of the foam which is prepared according to the invention and for which the mechanical values change to a far lesser extent. After storage under moist and warm conditions, moreover, substantially less MDA is found in the novel foam than in the comparative foam. This example shows that the novel catalysts, together with other catalysts, can advantageously be used as additives for improving the mechanical properties and reducing the formation of aromatic amines after storage under moist and warm conditions.

Example 19

Catalytic Activity of the Catalyst from Example 16

In order to be able to assess the catalytic activity of the catalyst from example 16, foaming experiments were carried out in which either no catalyst or only this catalyst was used.

Comparative Experiment without Addition of Catalyst:

100 g of polyol component were mixed with 48.5 g of isocyanate component (index 90) in a polyethylene bucket having a capacity of 1.1 l, the components having the following compositions:

Polyol Components:

97 parts by weight of Lupranol® 2090, molecular weight: 6000, OH number: 28 (Elastogran GmbH)

3 parts by weight of Lupranol® 2047, molecular weight 4000, OH number: 42 (Elastogran GmbH)

3.31 parts by weight of water 0.5 part by weight of Tegostab® B8631 (Goldschmidt)

Isocyanate Components:

Mixture of 42 parts of Lupranat® M 20 W (polymer MDI, Elastogran GmbH) and a mixture of 2,4'- and 4,4'-MDI (11 parts of Lupranat® ME and 47 parts of Lupranat® MI, Elastogran GmbH)

The reacting material began to foam after 60 seconds (cream time) but then collapsed completely, so that no useable flexible polyurethane foam was obtained. The gel time of the collapsed material was 660 seconds.

Experiment using the Novel Catalyst from Example 16:

100 g of polyol component were mixed with 48.1 g of isocyanate component (index 90) in a polyethylene bucket having a capacity of 1.1 l, the components having the following compositions:

Polyol Components:

97 parts by weight of Lupranol® 2090, molecular weight: 6000, OH number: 28 (Elastogran GmbH)

3 parts by weight of Lupranol® 2047, molecular weight 4000, OH number: 42 (Elastogran GmbH)

3.31 parts by weight of water 0.5 part by weight of Tegostab® B8631 (Goldschmidt)

4 parts by weight of catalyst from example 16

Isocyanate Component:

Mixture of 42 parts of Lupranat® M 20 W (polymer MDI, Elastogran GmbH) and a mixture of 2,4'- and 4,4'-MDI (11 parts of Lupranat® ME and 47 parts of Lupranat® MI, Elastogran GmbH)

The reacting material began to foam after 29 seconds (cream time) and formed a stable flexible polyurethane foam. The gel time of the foam was 220 seconds.

These experiments show that the novel catalyst from example 16 has sufficient catalytic activity for obtaining a stable foam, which was not possible without the catalyst.

We claim:

1. A catalyst containing, as structural units, at least one tertiary amino group, at least one group which, after its decomposition, is capable of complexing or protonating the tertiary amino group, and at least one isocyanate-reactive group reactive toward isocyanates.

2. A catalyst as claimed in claim 1, wherein the decomposition is effected by hydrolysis.

3. A catalyst as claimed in claim 1, which catalyzes the reaction of isocyanates with compounds reactive toward isocyanates.

4. A catalyst containing at least one tertiary amino group, at least one structural unit which, after its decomposition, is capable of complexing or protonating the tertiary amino group, and which is selected from the following group: carboxylic esters, sulfonic esters, carboxylic anhydrides, lactones, sultones, phosphoric esters and/or phosphonic esters, and at least one isocyanate-reactive group reactive toward isocyanates.

5. A process for the preparation of polyisocyanate polyadducts, comprising reacting an isocyanate with an isocyanate-reactive component in the presence of a catalyst as claimed in any of claims 1 to 4.

6. A catalyst as claimed in claim 1, wherein a number of the at least one group is greater than or equal to a number of the at least one tertiary amino group.

7. A catalyst as claimed in claim 4, wherein the decomposition is effected by hydrolysis.

8. A catalyst as claimed in claim 4, which catalyzes the reaction of isocyanates with compounds reactive toward isocyanates.

9. A catalyst as claimed in claim 4, wherein a number of the at least one structural unit is greater than or equal to a number of the at least one tertiary amino group.

* * * * *